(12) United States Patent
Poon et al.

(10) Patent No.: US 11,281,266 B2
(45) Date of Patent: Mar. 22, 2022

(54) ANTI-CONDENSATION METHOD AND SYSTEM FOR DATA CAPTURE DEVICE

(71) Applicant: ZEBRA TECHNOLOGIES CORPORATION, Lincolnshire, IL (US)

(72) Inventors: Chung Keung Poon, Scarborough (CA); Ping-Hsi Hung, Taipei (TW); Michael V. Seguin, Oakville (CA)

(73) Assignee: Zebra Technologies Corporation, Lincolnshire, IL (US)

( * ) Notice: Subject to any disclaimer, the term of this patent is extended or adjusted under 35 U.S.C. 154(b) by 12 days.

(21) Appl. No.: 16/415,602

(22) Filed: May 17, 2019

(65) Prior Publication Data

US 2020/0363847 A1 Nov. 19, 2020

(51) Int. Cl.
*G06F 1/20* (2006.01)
*G06F 1/16* (2006.01)

(52) U.S. Cl.
CPC ............ *G06F 1/206* (2013.01); *G06F 1/1626* (2013.01)

(58) Field of Classification Search
CPC ................................ G06F 1/206; G06F 1/1626
See application file for complete search history.

(56) References Cited

U.S. PATENT DOCUMENTS

| 9,152,178 | B2 | 10/2015 | Koch | |
|---|---|---|---|---|
| 10,365,671 | B1* | 7/2019 | Nelson | G06Q 10/087 |
| 2003/0211820 | A1* | 11/2003 | Tsuji | B60H 1/00821 |
| | | | | 454/93 |
| 2012/0047929 | A1* | 3/2012 | Delorme | B60S 1/026 |
| | | | | 62/155 |
| 2015/0124390 | A1* | 5/2015 | Koch | G06F 1/1633 |
| | | | | 361/679.26 |
| 2018/0252558 | A1* | 9/2018 | Ueda | G01D 11/24 |

* cited by examiner

*Primary Examiner* — Kenneth M Lo
*Assistant Examiner* — Jonathan Michael Skrzycki

(57) ABSTRACT

A data capture device includes a housing supporting a window at a scan opening, a data capture module with a scanner field of view directed through the scan window, a heater controllable to heat the window, a non-contact temperature sensor with a sensor field of view directed at the scan window, an auxiliary temperature sensor, a humidity sensor, and a controller. The controller is configured to receive (i) a window temperature from the non-contact temperature sensor, (ii) an external ambient temperature from the auxiliary temperature sensor, and (iii) an external ambient humidity from the humidity sensor. The controller then determines a dew point according to the ambient temperature and the ambient humidity, and selects a power level for the heater based on a comparison of the window temperature and the dew point.

19 Claims, 7 Drawing Sheets

ANTI-CONDENSATION METHOD AND SYSTEM FOR DATA CAPTURE DEVICE

BACKGROUND

Data capture devices, such as handheld barcode scanners, are deployed in a variety of environments, including facilities with walk-in freezers and other temperature-controlled areas. When a data capture device moves between a temperature-controlled area and the remainder of a facility, condensation may form on surfaces of the device. When condensation forms on some surfaces of the device, such as a scan window, the barcode scanning or other data capture performance of the device may be reduced.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
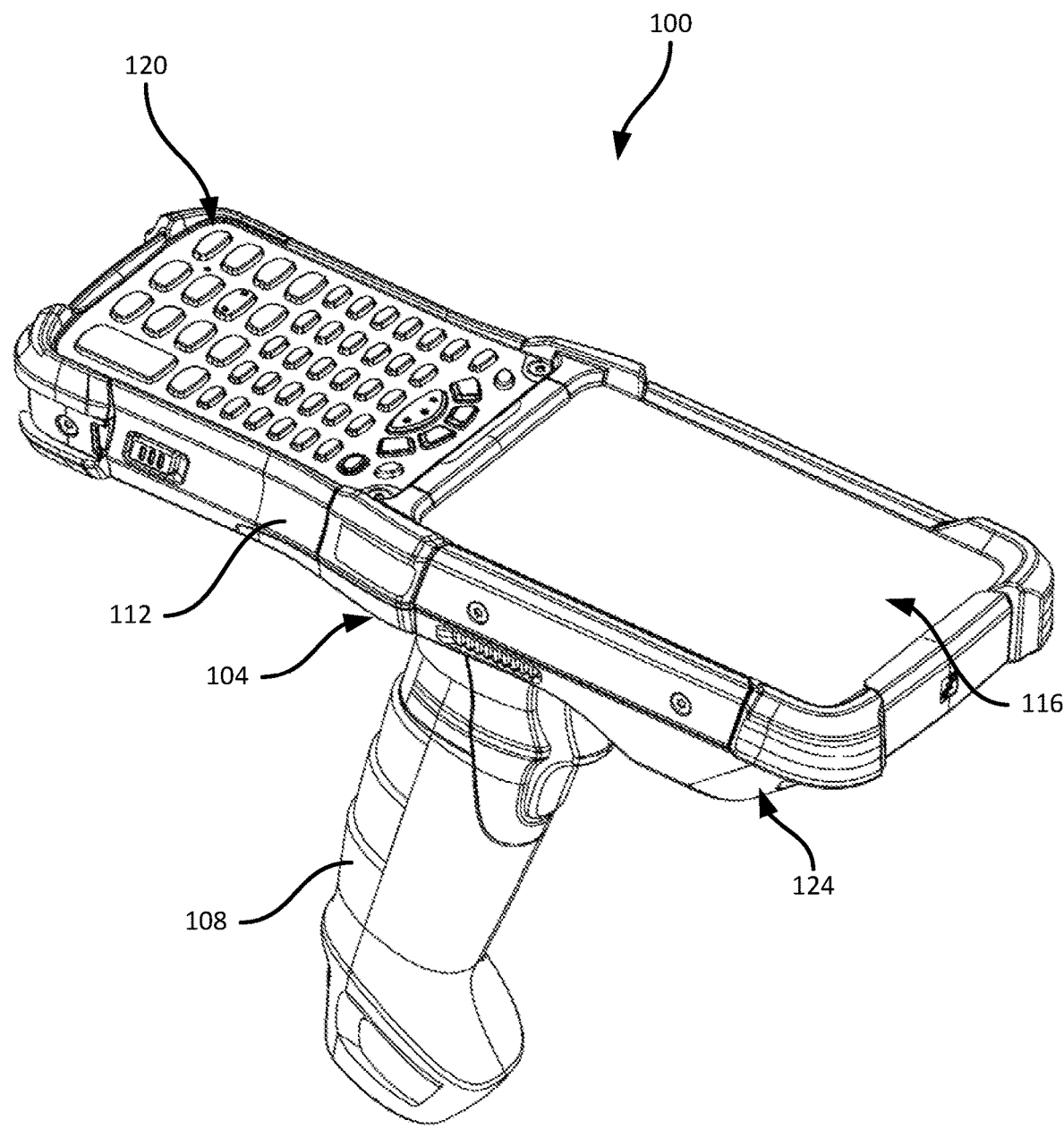
FIG. 1 is an isometric view of a data capture device, viewed from the top and the front.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a data capture device including: a housing supporting a window at a scan opening of the housing; a data capture module having a scanner field of view directed through the scan window; a heater controllable to heat the window; a non-contact temperature sensor having a sensor field of view directed at the scan window; an auxiliary temperature sensor; a humidity sensor; and a controller configured to: receive (i) a window temperature from the non-contact temperature sensor, (ii) an external ambient temperature from the auxiliary temperature sensor, and (iii) an external ambient humidity from the humidity sensor; determine a dew point according to the ambient temperature and the ambient humidity; and select a power level for the heater based on a comparison of the window temperature and the dew point.

Additional examples disclosed herein are directed to an anti-condensation method in a data capture device, the method comprising: receiving a window temperature of a scan window of the data capture device from a non-contact temperature sensor having a sensor field of view directed at the scan window; receiving an external ambient temperature from an auxiliary temperature sensor of the data capture device; receiving an external ambient humidity from a humidity sensor of the data capture device; determining a dew point according to the ambient temperature and the ambient humidity; and selecting a power level for a scan window heater based on a comparison of the window temperature and the dew point.

Further examples disclosed herein are directed to a non-transitory computer-readable medium storing a plurality of instructions executable by a processor of a data capture device to configured the data capture device to: receive a window temperature of a scan window of the data capture device from a non-contact temperature sensor having a sensor field of view directed at the scan window; receive an external ambient temperature from an auxiliary temperature sensor of the data capture device; receive an external ambient humidity from a humidity sensor of the data capture device; determine a dew point according to the ambient temperature and the ambient humidity; and select a power level for a scan window heater based on a comparison of the window temperature and the dew point.

Some data capture devices are equipped with heating elements to mitigate the formation of condensation on surfaces such as scan windows, to mitigate the reduction in data capture performance that condensation can cause. However, the control of such heating elements may result in insufficient activation of the heating elements, leading to the formation of condensation, and/or excessive operation of the heating elements, leading to excessive power consumption. The embodiments discussed below implement various sensor platforms and control mechanisms to mitigate insufficient heating element activation and/or excessive power consumption by heating elements.

FIG. 1 depicts a data capture device 100, which in the illustrated embodiment is a handheld data capture device. The mobile device 100 in the example illustrated in FIG. 1. includes a housing 104 that defines a grip portion 108 and a body portion 112. In the present example the grip portion 108 is a pistol grip, although in other examples the grip 108 can have various other configurations, or can simply be omitted.

The housing 104, and particularly the body portion 112, supports various components of the device 100. Certain components, including microcontrollers, communication assemblies, and the like, are contained within the housing 104 and are therefore not exposed to the exterior of the device 100. Other components form an operator interface of the device 100, and are therefore at least partially exposed to the exterior of the device 100. Such interface components include a display module 116 and a keypad module 120. The device 100 also includes a data capture assembly 124 (e.g. a barcode scanner) mounted on, or integrated with, the body portion 112. In the present example, the data capture assembly 124 is integrated with the body portion 112. Certain features of the data capture assembly 124 will be discussed in greater detail below.

Figure 2:
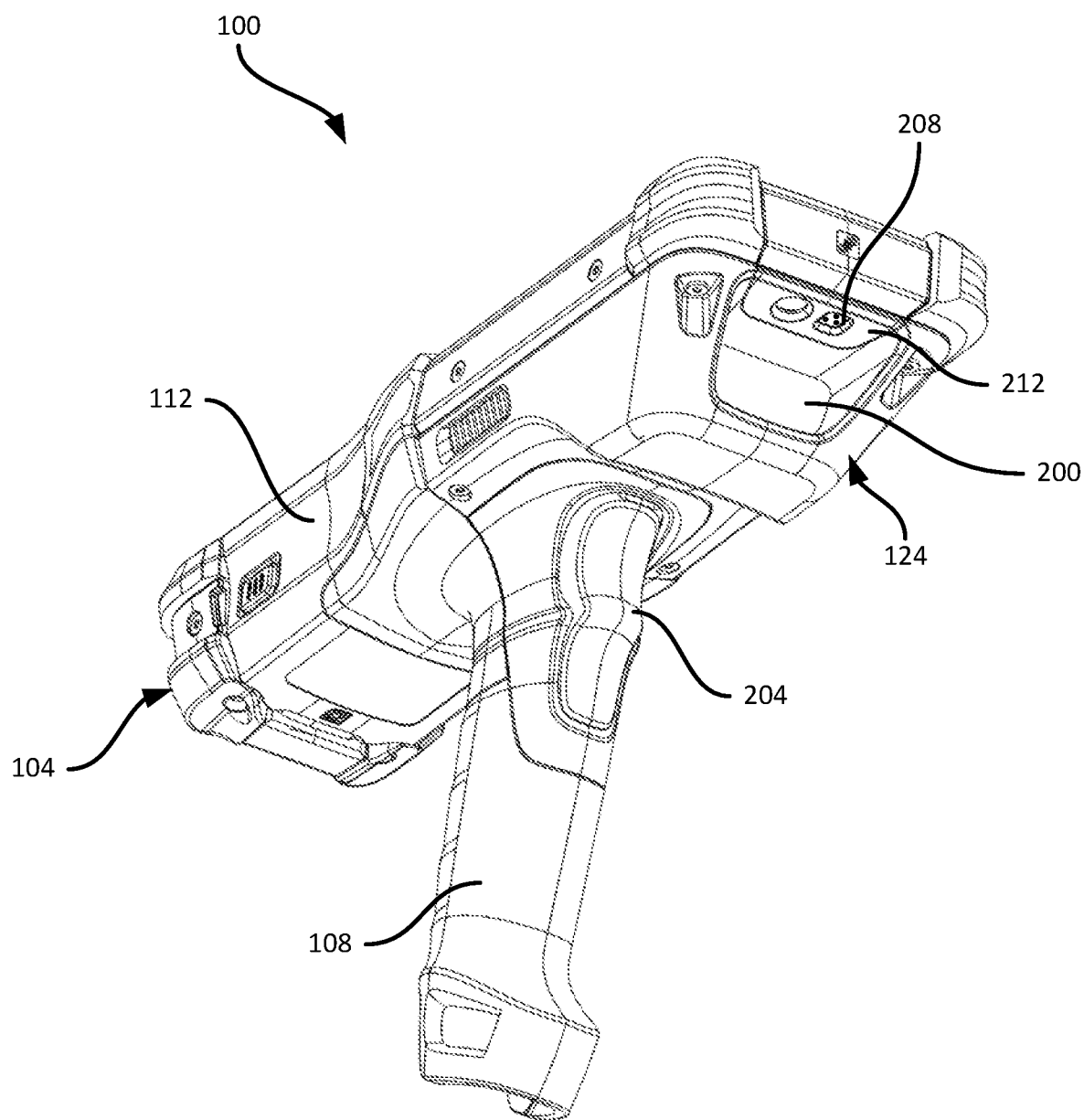
FIG. 2 is an isometric view of a data capture device, viewed from the bottom and the front.

Turning to FIG. 2, the data capture assembly 124 is shown in greater detail. In particular, the data capture assembly 124 includes a scan window 200 disposed at an opening in the body portion 112 of the housing 104. The data capture assembly 124 includes a suitable combination of emitters and/or sensors (e.g. image sensors, laser emitters and the like) having a field of view that extends from the interior of the data capture assembly 124 through the scan window 200, to scan barcodes or other machine-readable indicia from objects external to the device 100. Scan operations can be initiated responsive to the activation of an input at the device 100, such as a trigger 204 mounted on the grip portion 108.

The device 100 also includes, as will be discussed in greater detail below, a vent 208, such as a waterproof membrane vent (e.g. a GORE vent manufactured by W.L. Gore & Associates, Inc., located at 555 Paper Mill Rd., Newark, Del. 19711) for pressure equalization between the interior and the exterior of the device 100. The vent 208 is provided in a lower wall 212 of the body 112, adjacent to the scan window 200.

The device 100 may be deployed in a wide variety of environments, including transport and logistics facilities (e.g. warehouses), healthcare facilities, and the like. Some facilities in which the device 100 is deployed include environmentally-controlled areas such as walk-in refrigerators, freezers and the like. Such an area is distinguished from the remainder of a facility containing the environmentally-controlled area by a lower temperature (e.g. about −10 degrees C. inside a walk-in freezer, in comparison with a temperature of about 20 degrees C. in the remainder of the facility). When the device 100 is moved between an environmentally-controlled area such as a walk-in freezer and the remainder of a facility, the resulting rapid change in temperature and humidity may cause condensation to form on the scan window 200. Condensation, as will be apparent to those skilled in the art, can impede the operation of the data capture assembly 124 by obscuring the field of view of the sensor(s) employed by the data capture assembly 124.

To mitigate or avoid the formation of condensation on the scan window 200, and to accelerate the removal of condensation from the scan window 200 when condensation does form, the device 100 therefore includes certain features that enable the device 100 to assess the likelihood of condensation forming on the scan window 200. The device 100 also includes a heater that heats the scan window 200 to prevent or remove condensation therefrom. The heater may be, for example, a transparent film heater integrated into or otherwise applied on the scan window 200 (e.g. a layer of Indium Tin Oxide, ITO). The device 100, as will be described below, controls the heater based on the assessed likelihood of condensation forming on the scan window 200.

Figure 3:
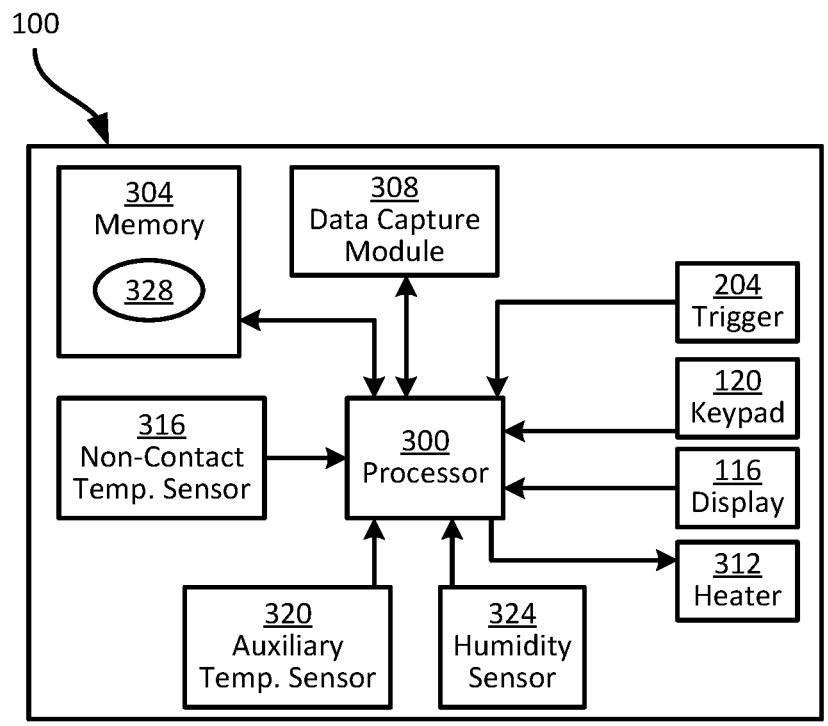
FIG. 3 is a block diagram of certain internal hardware components of the data capture device of FIGS. 1 and 2.

Turning to FIG. 3, before discussing the operation of the device 100 to mitigate the formation of condensation on the scan window 200 in further detail, certain internal components of the device 100 will be discussed in greater detail.

As shown in FIG. 3, the device 100 includes a central processing unit (CPU), also referred to as a processor 300, interconnected with a non-transitory computer readable storage medium, such as a memory 304. The memory 304 includes a suitable combination of volatile memory (e.g. Random Access Memory (RAM)) and non-volatile memory (e.g. read only memory (ROM), Electrically Erasable Programmable Read Only Memory (EEPROM), flash). The processor 300 and the memory 304 each comprise one or more integrated circuits (ICs).

The components of the device 100, including the display 116, the keypad 120 and the trigger 204 shown in FIGS. 1 and 2, are interconnected with the processor 300 via one or more communication buses and powered by a battery or other power source, over the communication buses or by distinct power buses (not shown). The device 100 also includes a data capture module 308, including the above-mentioned emitters and/or sensors disposed behind the scan window 200 and configured to capture data from objects within the field of view of the data capture module 308.

The device 100 also includes components employed to assess the likelihood of condensation forming on the window 200, and to reduce or prevent the formation of such condensation. In addition to a heater 312, the device 100 includes a non-contact temperature sensor 316, such as an infrared temperature sensor, having a sensor field of view that is directed towards at least a portion of the window 200, to measure the temperature of the window 200. The device 100 also includes sensors employed to measure ambient conditions external to the device 100 (i.e. of the surrounding environment of the device 100). In particular, the device includes an auxiliary temperature sensor 320, such as a thermistor or other suitable sensor, and a humidity sensor 324. In some examples, the auxiliary temperature sensor 320 and the humidity sensor 324 are integrated in a single physical sensor package.

The memory 304 stores a plurality of applications, each including a plurality of computer readable instructions executable by the processor 300. The execution of the above-mentioned instructions by the processor 300 causes the device 100 to implement certain functionality, as discussed herein. The applications are therefore said to be configured to perform that functionality in the discussion below. In the present example, the memory 304 of the device 100 stores an anti-condensation application 328, also referred to herein as the application 328. The device 100, via execution of the application 328 by the processor 300, collects data from the sensors 316, 320 and 324, and to assess a likelihood of condensation forming on the window 200 based on the collected data. The device 100 further controls the heater 312 based on the outcome of the above-mentioned assessment. The processor 300, as configured via the execution of the application 328, may also be referred to as a controller 300. In some examples, the functionality implemented by the controller 300 is implemented by of one or more dedicated circuits, such as an application-specific integrated circuit (ASIC), a field-programmable gate array (FPGA) or the like.

With reference to FIGS. 4, 5A, 5B, 6A and 6B, an example of a physical arrangement of the sensors 316, 320 and 324 within the device 100 will be discussed, to enable the device 100 to assess the likelihood of condensate formation on the window 200 and control the heater 312 accordingly.

Figure 4:
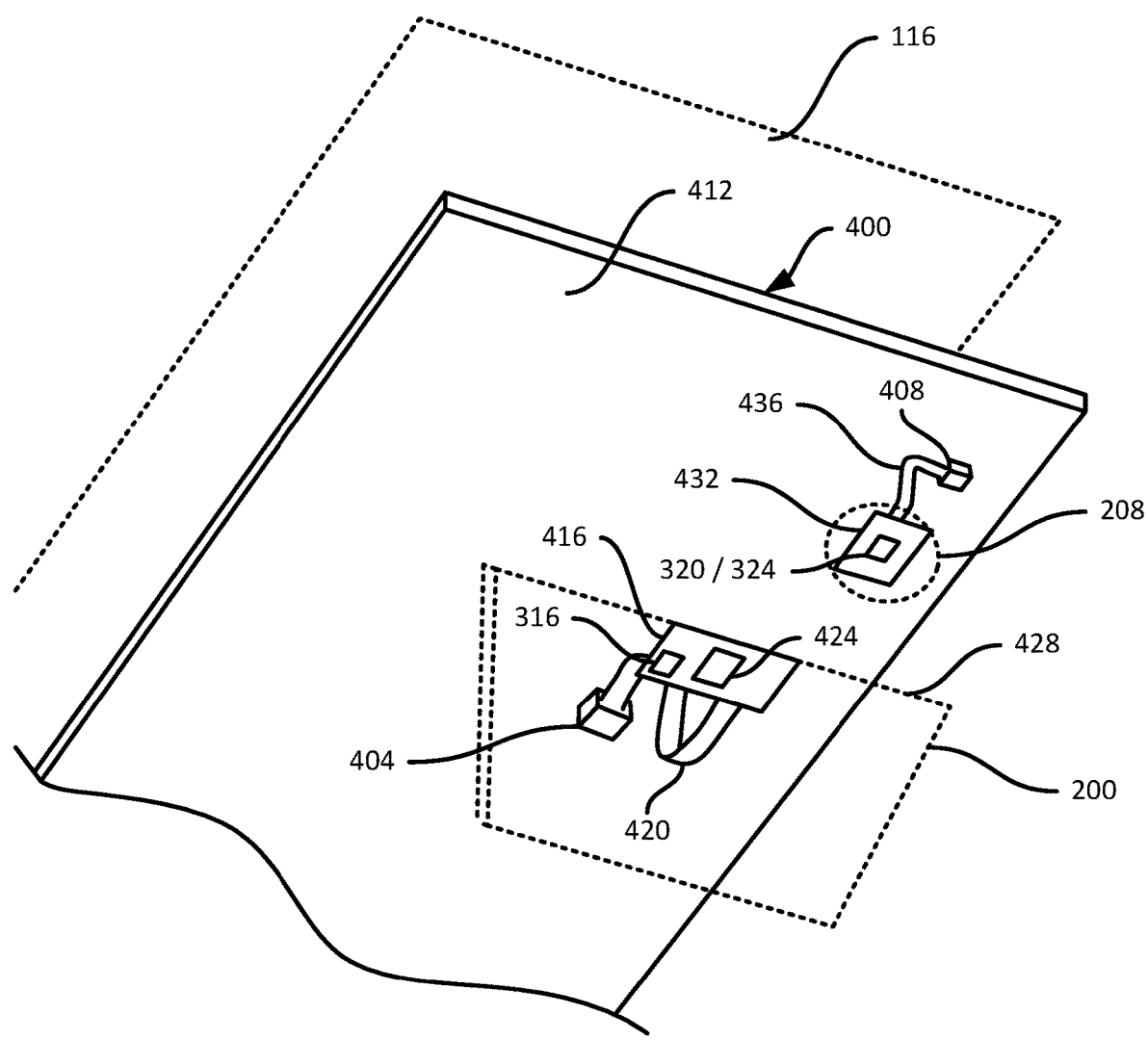
FIG. 4 is a diagram illustrating the placement of sensor platforms within the data capture device of FIGS. 1 and 2.

Turning to FIG. 4, certain internal components of the device 100 are shown. The components illustrated in FIG. 4 are shown with the device 100 in the orientation shown in FIG. 2. To clarify the overall position of the device 100 in FIG. 4, the positions of the display 116, the scan window 200 and the vent 208 relative to the internal components illustrated are also shown in dashed lines. The device 100 includes a support member 400 disposed within the housing 104 (specifically, within the body portion 112). The support member 400, in the present example, is a printed circuit board (PCB) bearing the above-mentioned communication and/or power buses. The support member 400 also carries the processor 300, memory 304 and various other internal components of the device 100. As will be apparent from FIG. 4, the support member 400 is disposed between the display 116 and the window 200 (i.e. below the display 116, and above the window 200).

The support member 400 carries at least one port enabling the processor 300 to receive data from the sensors 316, 320 and 324, and to supply power and control signals to the heater 312 integrated with the window 200. In the present example, the support member 400 includes a first port 404 and a second port 408 on a lower surface 412 thereof. The device 100 also includes a window sensor platform 416 connected to the first port 404 via a connector 420, such as a flexible printed cable (FPC). The window sensor platform 416 includes a PCB, an expanded portion of the connector 420, or the like, sufficient to support the non-contact temperature sensor 316 on a lower surface thereon, as shown in FIG. 4. The window sensor platform 416 also supports, on the lower surface, a power contact 424 for the heater 312. The power contact 424, as will be discussed below, is configured to engage with a power connector (not shown in FIG. 4) of the heater 312 to supply power to the heater 312. The window sensor platform 416 is disposed adjacent to an upper edge 428 of the window 200, such that the non-contact sensor 316 has a field of view aimed downwards at the window 200, as discussed below in connection with FIGS. 5A and 5B.

The device 100 further includes an ambient sensor platform 432 connected to the second port 408 via a connector 436, such as an FPC. The ambient sensor platform 432 can include a PCB, an expanded portion of an FPC, or the like. The ambient sensor platform 432 supports, on a lower surface thereof, a sensor package including both the auxiliary temperature sensor 320 and the humidity sensor 324. In other examples, the auxiliary temperature sensor 320 and the humidity sensor 324 can be separately deployed on the ambient sensor platform 432. As seen in FIG. 4, the ambient sensor platform 432 is disposed adjacent to the vent 208, exposing the sensors 320 and 324 to the atmosphere external to the device 100.

Figure 5A:
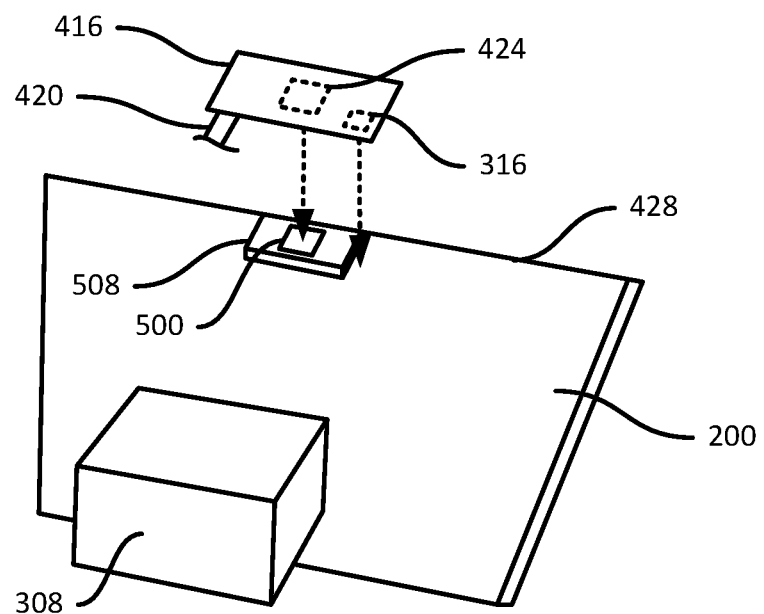
FIG. 5A is a diagram illustrating the placement of a window sensor platform of FIG. 4.
Figure 5B:
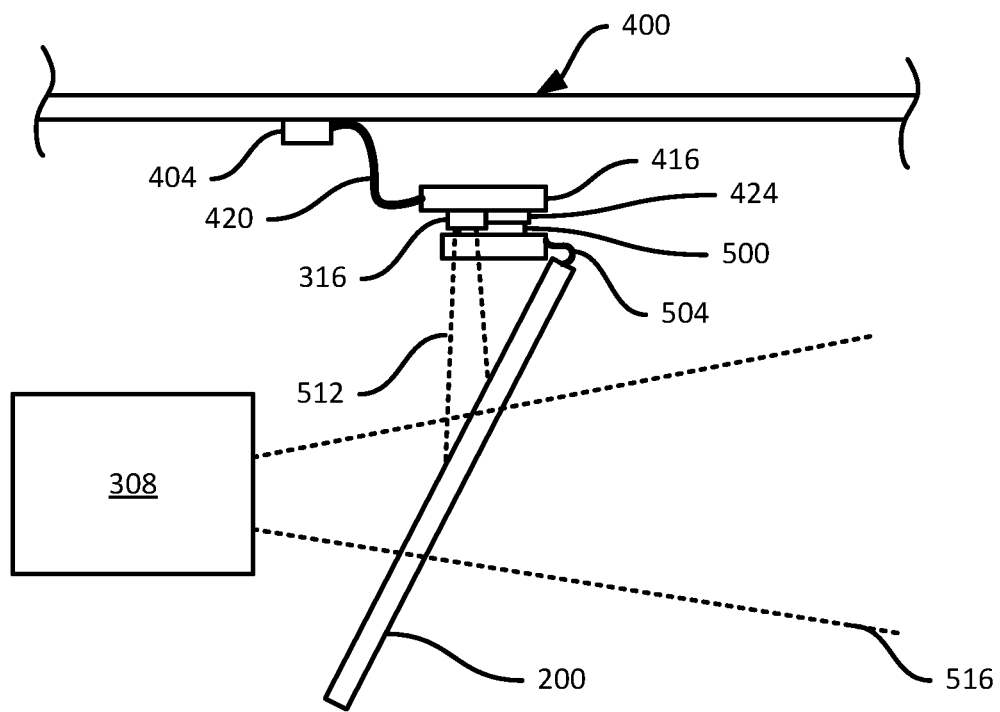
FIG. 5B is a side view of the window sensor platform.

Turning now to FIG. 5A, the physical structure and orientation of the window sensor platform 416 is shown in greater detail. FIG. 5A illustrates the data capture module 308, the window 200, the window sensor platform 416 and associated components from the interior of the device 100 (that is, viewing an internal surface of the window 200). The device 100 includes a heater contact 500 that is electrically connected to the heater 312 within the window 200, e.g. via a cable 504, as shown in FIG. 5B (which illustrates a side view of the structure shown in FIG. 5A). The heater contact 500, in the present example, is supported on a heater contact platform 508 adjacent to the upper edge 428 of the window 200. The heater contact platform 508 is, in the present example, defined by an interior portion of the body 112 of the housing 104 (the remainder of the housing 104 is not shown in FIG. 5A).

As shown in FIG. 5A, the window sensor platform 416 is illustrated in an exploded position away from the heater contact platform 508. When the window sensor platform 416 is in an assembled position, as shown in FIG. 5B, the power contact 424 physically engages the heater contact 500 to provide power and/or control signals to the heater 312 within the window 200.

In addition, the non-contact temperature sensor 316 is positioned near the upper edge 428 of the window 200, beside the heater contact platform 500. A field of view 512 of the sensor 316 therefore extends downwards to the window 200. As seen in FIG. 5B, the window 200 is inclined such that the field of view 512, which is perpendicular to the support member 400, impacts a portion of the window 200. In other examples, the sensor 316 itself can be inclined at an angle other the ninety degrees relative to the support member 400, and the window 200 can be perpendicular to the support member 400. A field of view 516 of the data capture module 308, extending through the window 200 towards the exterior of the device 100, is also illustrated in FIG. 5B.

The arrangement of components shown in FIGS. 5A and 5B and the use of the non-contact sensor 316 enable the device 100 to obtain a temperature measurement of the window 200 itself, without placing a sensor directly on the window 200 (potentially impeding the field of view 516) and without introducing delay to temperature measurements as a result of thermal inertia that would be associated with the mounting hardware of a contact-dependent temperature sensor.

Figure 6A:
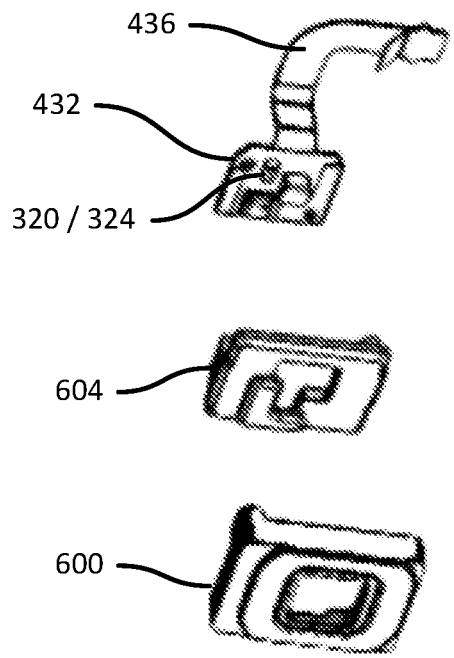
FIG. 6A is an exploded view of an ambient sensor platform of FIG. 4 and supporting structures.
Figure 6B:
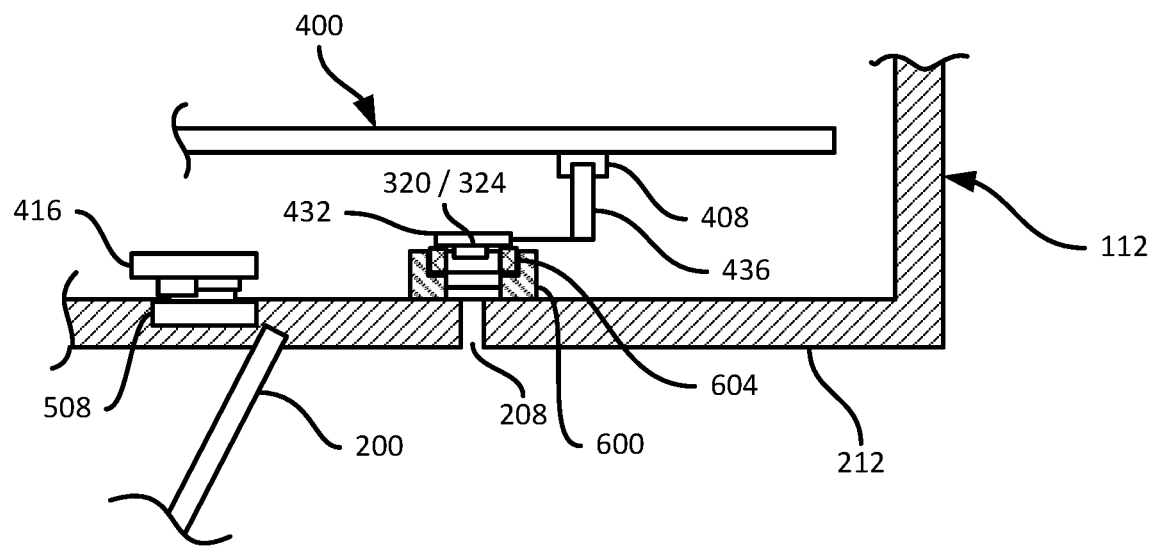
FIG. 6B is a side view of the ambient sensor platform of FIG. 6A.

Turning now to FIGS. 6A and 6B, the arrangement of the auxiliary temperature sensor 320 and the humidity sensor 324 will be described in greater detail. FIG. 6A is an exploded view of the ambient sensor platform 432 and associated support structures, and FIG. 6B illustrates the components shown in FIG. 6A in an assembled arrangement. The device 100 includes a gasket 600 or other suitable seal member disposed at the vent 208. The gasket 600 supports the ambient sensor platform 432. In some examples the ambient sensor platform 432 is supported directly on the gasket 600. In the illustrated example, however, the device 100 also includes a holder 604 that engages with the gasket 600 and supports the ambient sensor platform 432. As seen in FIG. 6B, in which a portion of the housing body 112, including the lower wall 212, is shown in cross-section, the gasket 600 and the holder 604 support the ambient sensor platform 432, and therefore the sensors 320 and 324, adjacent to the vent 208, thus exposing the sensors 320 and 324 to the atmosphere surrounding the device 100.

The physical arrangement of the sensors 316, 320 and 324 as discussed above enables the device 100 to assess the likelihood of condensation forming on the window 200 and to power the heater 312 (via the window sensor platform 416) to reduce or avoid such condensation.

Figure 7:
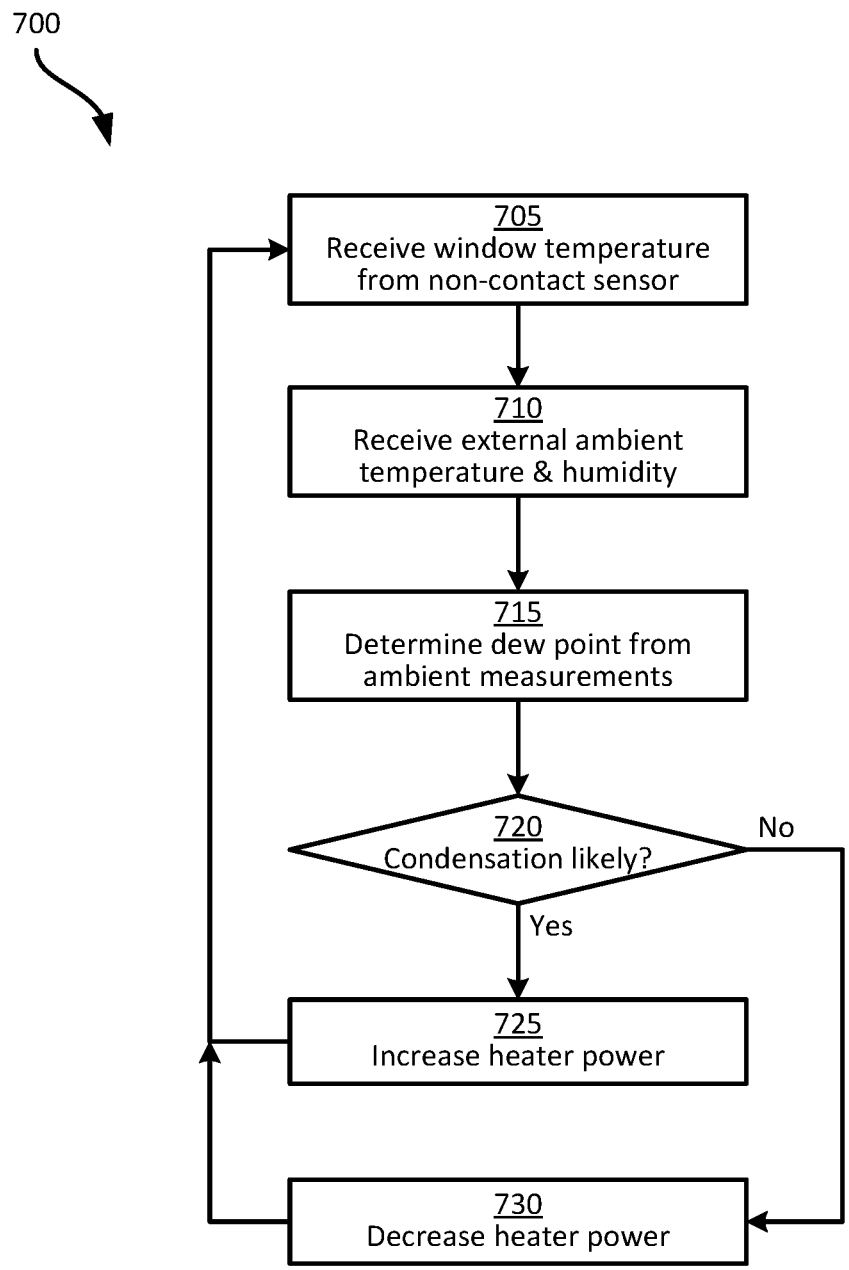
FIG. 7 is a flowchart of a method for mitigating the formation of condensation on a scan window of the device of FIGS. 1 and 2.

Turning to FIG. 7, a method 700 of mitigating the formation of condensation on the scan window 200 is illustrated. The method 700 will be described below in conjunction with its performance by the device 100. More specifically, the blocks of the method 700 are performed by the processor 300 as configured by executing the application 328.

At block 705, the processor 300 receives a window temperature from the non-contact temperature sensor 316. The window temperature received at block 705, as will be apparent from the discussion above, indicates the current temperature of the portion of the window 200 within the field of view 512 of the sensor 316.

At block 710, the processor 300 receives an external ambient temperature measurement from the auxiliary temperature sensor 320, and an external ambient humidity (e.g. relative humidity, as a percentage) measurement from the humidity sensor 324. The external ambient temperature and humidity received at block 710 correspond to the atmospheric conditions surrounding the device 100 at the time the measurements are taken by the sensors 320 and 324. The performance of blocks 705 and 710 can occur in the reverse order as set out in FIG. 7, or blocks 705 and 710 can be performed substantially simultaneously.

At block 715, the processor 300 determines the current ambient dew point of the air surrounding the device 100, based on the ambient temperature and humidity measurements obtained at block 710. In the present example, the processor 300 determines the current ambient dew point according to the following simplified dew point calculation: Dew Point=Ambient Temperature−[(100−Relative Humidity)/5]. Thus, for an external ambient temperature of 22 degrees C. and an external ambient relative humidity of 60%, the dew point is 14 degrees C.

At block 720, the processor 300 determines whether condensation is likely to form on the window 200, given the current window temperature from block 705 and the current external ambient dew point from block 715. In some embodiments, the determination at block 720 includes a comparison of the current window temperature with the current dew point. If the current window temperature is below the current dew point, for example because the device 100 has recently exited a cold area of a facility and the window 200 is therefore cooler than ambient conditions, the determination at block 720 is affirmative. Otherwise, the determination at block 720 is negative.

In other embodiments, the processor 300 performs the determination at block 720 by generating rates of change for the window temperature and the dew point, based not only on the current values obtained at blocks 705 and 715, but also on a determined number of earlier values (e.g. each window temperature and dew point obtained over the previous ten seconds). Based on such historical data, the processor 300 is configured to determine a rate of change for each of the window temperature and the dew point, for example in degrees per second. The processor 300 is then configured to determine, based on the current window temperature and dew point and on the rates of change, whether condensation is likely.

In some examples, the processor 300 determines a relative quantity for each performance of blocks 705 and 715, for example by subtracting the current dew point from the current window temperature. Temperatures may be expressed in absolute terms (e.g. using the Kelvin scale) for the relative quantity. The processor 300 is also configured to determine a rate of change of the relative quantity. The determination at block 720 is then performed based on the current relative quantity and its rate of change. For example, when the relative quantity and the rate of change are positive, indicating that the current window temperature exceeds the current dew point and is increasing relative to the dew point, the risk of condensation is minimal, and the determination at block 720 is negative.

In another example, the relative quantity may be positive but the rate of change may be negative, indicating that the current window temperature exceeds the current dew point but that the dew point and the window temperature are approaching one another. The processor 300 can therefore compare the rate of change to a predetermined threshold, or can determine a length of time in which the relative quantity will reach zero (i.e. in which the current window temperature will fall below the current dew point). If the time period mentioned above is below a predefined threshold, the determination at block 720 is affirmative.

In yet another example, when the relative quantity mentioned above is negative, indicating that the current window temperature is below the current dew point, the determination at block 720 is affirmative regardless of the rate of change of the relative quantity.

Following the determination at block 720, the processor 300 selects a power level for the heater 312 based on the outcome of the determination. Responsive to an affirmative determination at block 720, the processor 300 increases the heater power at block 725. Responsive to a negative determination, on the other hand, the processor 300 decreases the heater power at block 730.

In some examples, the heater 312 is simply enabled (i.e. at full power) or disabled (i.e. at zero power). The processor 300 can therefore enable the heater 312 at block 725, or disable the heater at block 730. In other examples, the heater 312 can be controlled at intermediate power levels. In such examples, the processor 300 can increment a current heater power at block 725 or decrement the current heater power at block 730. The increments or decrements applied can be predefined, or can be determined dynamically by the processor 300. For example, a greater magnitude of the above-mentioned relative quantity can result in a larger increment to the current heater power.

Having selected a heater power, the processor 300 is configured to control the heater 312 according to the selected power. For example, the device 100 can include a heater controller (e.g. a pulse-width-modulation-based controller) between the processor 300 and the heater 312 that receives control signals from the processor 300 and controls the delivery of power to the heater 312 via the connector 420, the window sensor platform 416, the power contact 424, the heater contact 500 and the cable 504.

Following the performance of block 725 or block 730, the processor 300 returns to block 705 to continue monitoring current window temperature and dew point.

Variations to the above device and method are contemplated. For example, in other embodiments the device 100 includes additional sensors on either or both of the platforms 416 and 432. For example, the window sensor platform 416 can support an internal ambient temperature sensor and an internal ambient humidity sensor for monitoring ambient conditions inside the housing 104. In further examples, the ambient sensor platform 432 supports a pressure sensor, enabling the device 100 to also obtain a pressure measurement at block 710 for use in determining the dew point at block 715 employing a more accurate dew point computation.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less all features of a single disclosed embodiment. Thus the following claims are hereby incorporated into the Detailed Description, with each claim standing on its own as a separately claimed subject matter.

The invention claimed is:

1. A data capture device, comprising:
a handheld housing supporting a scan window at a scan opening of the housing, wherein the handheld housing comprises a main body portion and a grip portion;
a vent defined in the main body portion;
a data capture module having a scanner field of view directed through the scan window;
a heater controllable to heat the window;
a non-contact temperature sensor within the handheld housing, having a sensor field of view directed at the scan window, the non-contact temperature sensor supported away from an interior surface of the scan window and outside the scanner field of view by a window sensor platform;
an auxiliary temperature sensor configured to measure ambient temperature external to the data capture device;
a humidity sensor configured to measure ambient humidity external to the data capture device;
an ambient sensor platform supported within the main body portion adjacent to the vent and electrically connected to a support member, wherein the ambient sensor platform carries the auxiliary temperature sensor and the humidity sensor; and
a controller configured to:
  receive (i) a window temperature from the non-contact temperature sensor, (ii) the ambient temperature external to the data capture device from the auxiliary temperature sensor, and (iii) the ambient humidity external to the data capture device from the humidity sensor;
  determine a dew point according to the ambient temperature external to the data capture device and the ambient humidity external to the data capture device; and
  select a power level for the heater based on a comparison of the window temperature and the dew point.

2. The data capture device of claim 1, wherein the controller is configured, in order to select the power level, to:
determine whether the dew point exceeds the window temperature;
when the dew point exceeds the window temperature, select an increased power level; and
when the dew point does not exceed the window temperature, select a reduced power level.

3. The data capture device of claim 2, wherein the increased power level is a maximum power level, and wherein the decreased power level is a minimum power level.

4. The data capture device of claim 1, wherein the controller is configured to determine a rate of change associated with at least one of the window temperature and the dew point, and to select the power level according to the rate of change.

5. The data capture device of claim 1, wherein, the support member is configured to support the window sensor platform comprising the non-contact temperature sensor.

6. The data capture device of claim 5, wherein the window sensor platform is electrically connected to the support member.

7. The data capture device of claim 6, wherein the sensor field of view is perpendicular to the support member.

8. The data capture device of claim 6, wherein the scan window is supported by the housing at a non-right angle relative to the support member.

9. The data capture device of claim 6, wherein the window sensor platform is electrically connected to the support member by a flexible cable.

10. The data capture device of claim 6, further comprising:
a heater contact electrically connected to the heater; and
a heater power contact disposed on the window sensor platform and configured to engage with the heater contact to supply power to the heater.

11. The data capture device of claim 1, wherein the heater includes an Indium Tin Oxide (ITO) film integrated with the scan window.

12. The data capture device of claim 1, wherein the vent is defined in a lower wall of the housing adjacent to the scan window.

13. The data capture device of claim 1, further comprising:
a gasket surrounding the vent and supporting the ambient sensor platform.

14. An anti-condensation method in a data capture device, the method comprising:
receiving a window temperature of a scan window of the data capture device from a non-contact temperature sensor within a handheld housing of the data capture device, having a sensor field of view directed at the scan window, the non-contact temperature sensor supported away from an interior surface of the scan window and outside the scanner field of view by a window sensor platform, wherein the handheld housing comprises a main body portion and a grip portion, the main body portion defining a vent;
receiving an ambient temperature external to the data capture device from an auxiliary temperature sensor configured to measure the ambient temperature external to the data capture device, an ambient sensor platform supported within the main body portion adjacent to the vent and electrically connected to a support member, wherein the ambient sensor platform carries the auxiliary temperature sensor and a humidity sensor;
receiving an ambient humidity external to the data capture device from the humidity sensor configured to measure the ambient humidity external to the data capture device;
determining a dew point according to the ambient temperature external to the data capture device and the ambient humidity external to the data capture device; and
selecting a power level for a scan window heater based on a comparison of the window temperature and the dew point.

15. The method of claim 14, wherein selecting the power level comprises:
determining whether the dew point exceeds the window temperature;
when the dew point exceeds the window temperature, selecting an increased power level; and
when the dew point does not exceed the window temperature, selecting a reduced power level.

16. The method of claim 15, wherein the increased power level is a maximum power level, and wherein the decreased power level is a minimum power level.

17. The method of claim 14, further comprising:
determining a rate of change associated with at least one of the window temperature and the dew point; and
selecting the power level according to the rate of change.

18. The method of claim 14, further comprising:
receiving a further window temperature, a further ambient temperature external to the data capture device, and a further ambient humidity external to the data capture device;
determining a further dew point; and
selecting a further power level for the scan window heater based on a comparison of the further window temperature and the further dew point.

19. A non-transitory computer-readable medium storing a plurality of instructions executable by a processor of a data capture device to configured the data capture device to:
receive a window temperature of a scan window of the data capture device from a non-contact temperature sensor within a handheld housing of the data capture device, having a sensor field of view directed at the scan window, the non-contact temperature sensor supported away from an interior surface of the scan window and outside the scanner field of view by a window sensor platform, wherein the handheld housing comprises a main body portion and a grip portion, the main body portion defining a vent;
receive an ambient temperature external to the data capture device from an auxiliary temperature sensor configured to measure the ambient temperature external to the data capture device, an ambient sensor platform supported within the main body portion adjacent to the vent and electrically connected to a support member wherein the ambient sensor platform carries the auxiliary temperature sensor and a humidity sensor;
receive an ambient humidity external to the data capture device from the humidity sensor configured to measure the ambient humidity external to the data capture device;
determine a dew point according to the ambient temperature and the ambient humidity; and
select a power level for a scan window heater based on a comparison of the window temperature and the dew point.

* * * * *